(12) United States Patent
Chabaud et al.

(10) Patent No.: US 11,644,564 B2
(45) Date of Patent: May 9, 2023

(54) METHOD FOR SIGNAL EVALUATION IN A LOCATING SYSTEM THAT INCLUDES MULTIPLE RADAR SENSORS

(71) Applicant: Robert Bosch GmbH, Stuttgart (DE)

(72) Inventors: Antoine Chabaud, Ludwigsburg (DE); Benedikt Loesch, Stuttgart (DE); Hermann Buddendick, Sindelfingen (DE); Michael Schoor, Stuttgart (DE); Stefan Chittka, Stuttgart-Sonnenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 41 days.

(21) Appl. No.: 17/015,340

(22) Filed: Sep. 9, 2020

(65) Prior Publication Data

US 2021/0080562 A1     Mar. 18, 2021

(30) Foreign Application Priority Data

Sep. 17, 2019    (DE) .......................... 102019214163.3

(51) Int. Cl.
| | | |
|---|---|---|
| *G01S 13/87* | (2006.01) | |
| *G01S 13/46* | (2006.01) | |
| *G01S 13/931* | (2020.01) | |

(52) U.S. Cl.
CPC ............ *G01S 13/872* (2013.01); *G01S 13/46* (2013.01); *G01S 13/931* (2013.01); *G01S 2013/468* (2013.01)

(58) Field of Classification Search
CPC .. G01S 2013/468; G01S 13/931; G01S 13/46; G01S 13/872; G01S 13/06; G01S 13/87; G01S 2013/466; G01S 7/40
See application file for complete search history.

(56) References Cited

U.S. PATENT DOCUMENTS 10,620,306 B2 *   4/2020   Kim ........................ G01S 13/89

FOREIGN PATENT DOCUMENTS

WO    WO-2019185739 A1 * 10/2019 ........... G01S 13/872

OTHER PUBLICATIONS

"Radar cross-section—Wikipedia.pdf" from https://web.archive.org/web/20190217071911/http://en.wikipedia.org/wiki/Radar_cross-section (Year: 2019).*
"RadarFundamentals_2018.pdf" from https://web.archive.org/web/20181024151319/http://faculty.nps.edu/jenn/seminars/radarFundamentals.pdf (Year: 2018).*

* cited by examiner

*Primary Examiner* — Bernarr E Gregory
*Assistant Examiner* — Yonghong Li
(74) *Attorney, Agent, or Firm* — Norton Rose Fulbright US LLP; Gerard Messina

(57) ABSTRACT

A method for signal evaluation in a locating system that includes multiple radar sensors whose locating ranges overlap one another. The method includes evaluating the signal of a first of the radar sensors and identifying distance cells that are not empty, for at least one of these distance cells: selecting a second of the radar sensors and determining a distance range in which the objects situated in the distance cell would have to be situated from the viewpoint of the second radar sensor, and classifying the object configuration in the distance range, based on the signal of the second radar sensor.

8 Claims, 3 Drawing Sheets

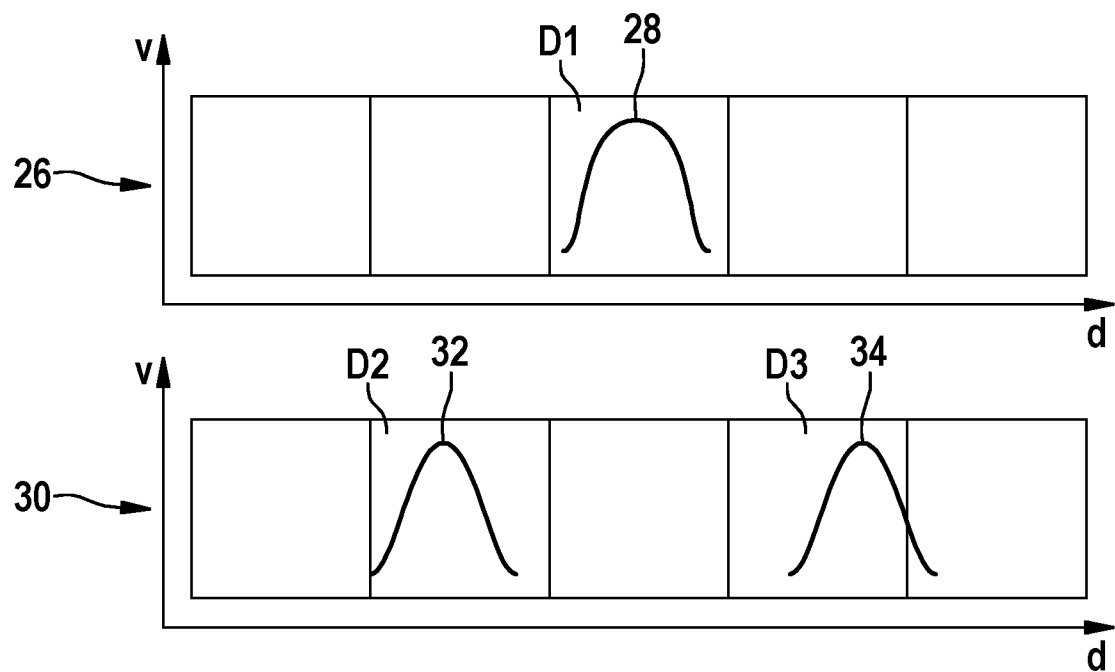
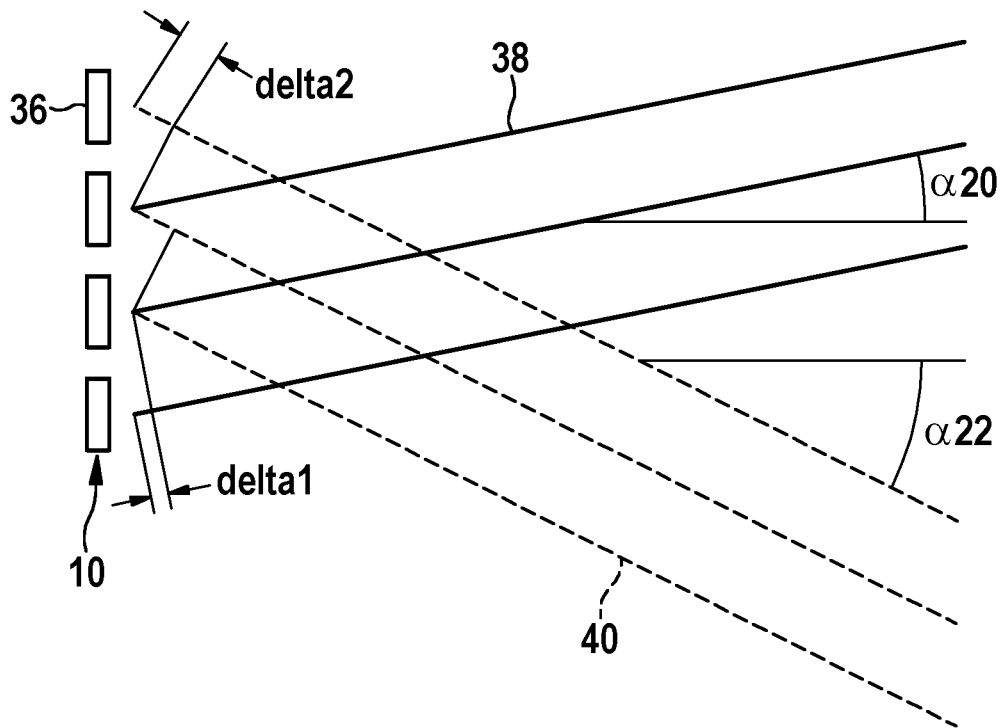
Fig. 2
Fig. 3

METHOD FOR SIGNAL EVALUATION IN A LOCATING SYSTEM THAT INCLUDES MULTIPLE RADAR SENSORS

CROSS REFERENCE

The present application claims the benefit under 35 U.S.C. § 119 of German Patent Application No. DE 102019214163.3 filed on Sep. 17, 2019, which is expressly incorporated herein by reference in its entirety.

FIELD

The present invention relates to a method for signal evaluation in a locating system that includes multiple radar sensors whose locating ranges overlap one another.

In particular, the present invention relates to a locating system for motor vehicles which is intended to allow preferably accurate detection of the traffic surroundings.

BACKGROUND INFORMATION

The radar sensors installed in motor vehicles typically detect the distances, relative speeds, and azimuth angles and optionally also elevation angles of the located objects. FMCW radar sensors are common in which the frequency of the transmitted radar signal is ramp-shaped modulated. The received radar echo is then mixed with a portion of the instantaneously transmitted signal, so that in an intermediate frequency band a beat signal is obtained whose frequency is a function of the frequency difference between the transmitted signal and the received signal. When the frequency ramps are very steep, the frequency difference is determined primarily by the signal propagation time and thus, the object distance. When the intermediate frequency signal is converted into a spectrum via a fast Fourier transform (FFT), in the spectrum each object is apparent in the form of a peak at a certain frequency that indicates the particular object distance. However, due to the digital signal processing, the distance space is divided into discrete distance cells. A cell is to be referred to as "empty" when, at the frequency in question, no signal above the noise level is received.

In general, the influence of the relative speed of the object, caused by the Doppler effect, on the frequency position also cannot be ignored. One option for separating the distance- and speed-dependent components from one another is to use frequency ramps having different slopes. Since the slope affects only the distance-dependent component, the object distance as well as the relative speed may be determined by comparing the frequency positions of the peaks for various ramps.

Another option is to transmit multiple frequency ramps having the same slope in rapid succession, the frequencies of the ramps in each case being offset relative to one another so that the ramps form a "ramp" having a gradually increasing frequency. As the result of a two-dimensional Fourier transform over the fast ramp and the slow ramp, the amplitude distribution is directly obtained in a two-dimensional distance-velocity (d-v space). In this space, for each object distance there is a plurality of distance cells which represent the different relative speeds.

To also allow the direction angles for the located objects (in the azimuth and/or in the elevation) to be measured, each radar sensor includes a plurality of transmitting antenna elements and/or a plurality of receiving antenna elements that are offset relative to one another on a straight line. When the radar echo does not strike this straight line at a right angle, propagation time differences from antenna element to antenna element result, which for the particular direction angle of the object result in a characteristic distribution of the (complex) amplitude of the received signal. The direction angle may then be at least estimated by searching in an antenna diagram for the amplitude distribution that best fits the measured distribution.

However, when multiple radar sensors are present whose locating ranges overlap with one another, a conventional multilateration method may also be applied in order to locate the objects in a two-dimensional coordinate system, based on the different signal propagation times for the various radar sensors.

In the conventional locating systems, the accuracy with which the traffic surroundings may be detected is limited due to the fact that the radar sensors have only a limited capability to separate objects, situated in the same distance cell, from one another.

SUMMARY

An object of the present invention is to provide a method that allows the surroundings to be detected with increased accuracy and reliability.

This object may be achieved according to example embodiments of the present invention. In accordance with an example embodiment of the present invention, a method is provided that includes the following steps:

evaluating the signal of a first of the radar sensors and identifying distance cells that are not empty, for at least one of these distance cells:
  selecting a second of the radar sensors and determining a distance range in which the objects situated in the distance cell would have to be situated from the viewpoint of the second radar sensor, and
  classifying the object configuration in the distance range, based on the signal of the second radar sensor.

According to the present invention, additional information concerning the surroundings is thus obtained by combining the signals obtained from multiple radar sensors, not in the sense of multilateration, but, rather, in such a way that the object configuration is classified in greater detail, and the separability and the dynamic range are thus improved.

Advantageous embodiments and refinements are described herein.

One important criterion in classifying the object configuration concerns the question of how many various radar targets are situated in the same nonempty distance cell. Thus far, this information has been obtainable only with limited accuracy and reliability within the scope of an angle estimation based on the amplitude distribution. However, one difficulty is that, in particular when multiple radar targets are situated in the same distance cell, the signals arriving from the multiple objects, and thus from various directions, overlap one another in such a way that the angular quality is reduced considerably, and an unambiguous interpretation of the amplitude distribution is thus made more difficult.

An example embodiment of the present invention provides an additional option, which is independent of the angle estimation, for distinguishing between single target and multiple target scenarios. Namely, when two radar targets for one of the radar sensors are situated in the same distance cell, for the other radar sensor they are very likely situated in two adjacent, but different, radar cells due to the physical distance between the radar sensors, so that a separation of the targets is possible with this radar sensor. With this second radar sensor, separate angle estimations may then be carried out in the two distance cells, and the results will be more accurate and reliable than the results that would be obtained with the first radar sensor.

Once the direction angles for the multiple targets are known, the amplitude distribution that would be expected for the measurement with the first radar sensor may be computed, and by comparing the expected amplitude distribution to the amplitude distribution actually measured in the first radar sensor, information may then be obtained concerning the relative signal strength of the two radar targets from the viewpoint of the first radar sensor.

In addition, the present invention allows the located objects to be further characterized based on the angular dependency of their radar cross section. The radar cross section, i.e., the signal strength with which a radar signal strikes an object from a certain direction and is then reflected back in the same direction, is a function of the direction from which the radar signal arrives, and the angular dependency of this radar cross section is characteristically a function of the geometry of the object in question, so that different object types, for example trucks, passenger vehicles, and two-wheelers, may be distinguished from one another based on the angular dependency of the radar cross section.

The present invention allows the same object to be viewed from different directions, using two different radar sensors, so that radar cross sections are obtained for two different angles, and information about the type of object may be deduced.

When at least one target is located in a certain distance cell using the first radar sensor, but no object can be found in the associated distance range for the second radar sensor, this indicates that the radar echo for this object is outside the dynamic range of this second radar sensor, either because the object for this radar sensor is situated at the boundary of the locating range, or because the radar cross section of the object is too small in the direction from which the second radar sensor views the object. Based on the distance data and angle data obtained with the first radar sensor, it may then be checked whether at least one of these hypotheses is plausible, or whether a malfunction of the locating system is present. For the second radar sensor, it is also optionally possible to temporarily reduce the noise threshold in order to check whether the weak signal may then also be detected with the second radar sensor.

Overall, evaluating and comparing the signals of the multiple radar sensors increases the likelihood that objects that are actually present are in fact also located using at least one of the radar sensors.

Exemplary embodiments of the present invention are explained in greater detail below with reference to the figures.

BRIEF DESCRIPTION OF THE DRAWINGS

FIG. 2 shows a diagram of the signals in a particular d-v space that are received from the two radar sensors in FIG. 1.

FIG. 3 shows a schematic diagram of an angle-resolving radar sensor.

DETAILED DESCRIPTION OF EXAMPLE EMBODIMENTS

Figure 1:
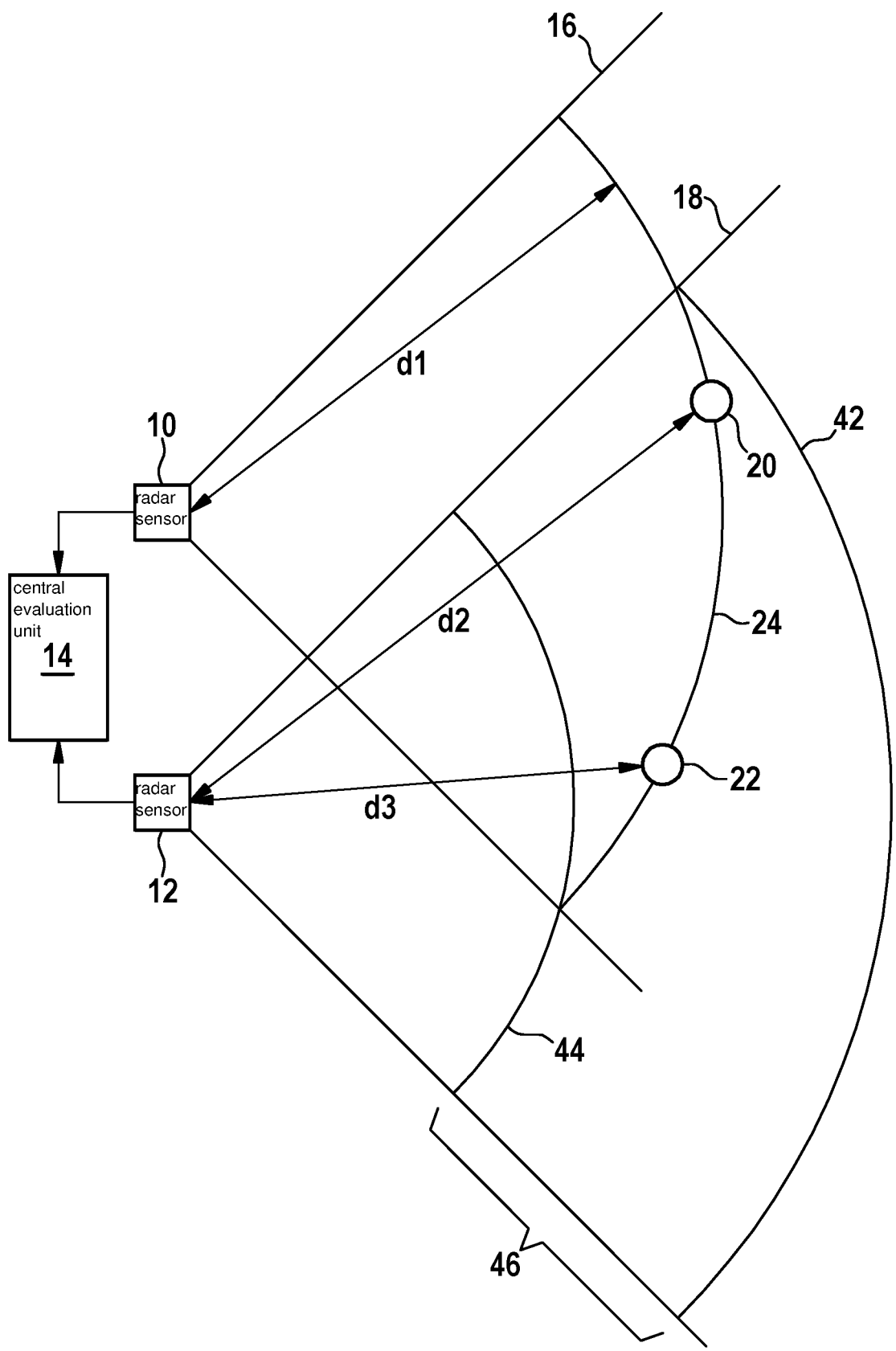
FIG. 1 shows a location diagram for a locating system that includes two radar sensors.

FIG. 1 shows a locating system, which in the present simplified example includes two radar sensors 10, 12, and a central evaluation unit 14 in which the signals of the radar sensors are combined and evaluated. The two radar sensors 10, 12 have locating ranges 16, 18, respectively, that overlap one another. Two objects 20, 22 that may be located with both radar sensors are situated in the overlap zone. The two objects 20, 22 are situated on a circle 24 that is centered on radar sensor 10, so that radar sensor 10 measures same distance d1 for these two objects. It is to be further assumed that the two objects 20, 22 also have same relative speed v relative to radar sensors 10, 12. In d-v space 26 (FIG. 2) of radar sensor 10, the two objects are thus represented by a single signal peak 28 that is situated in a single distance cell D1. As a result, the two objects are not separable from one another solely by distance and relative speed measurement using radar sensor 10.

Radar sensor 12 is spatially offset relative to radar sensor 10, and therefore measures two different distances d2 and d3 for the two objects 20, 22. In d-v space 30 of this radar sensor, the objects are thus represented by signal peaks 32 and 34, which are situated in different distance cells D2 and D3.

By evaluating the signals of radar sensor 12, it may thus be easily and reliably established that peak 28 is a superimposition of the radar echoes from two different objects.

This information is valuable, for example, when the azimuth angles of objects 20 and 22 are to be determined by angle estimation.

As shown in FIG. 3, radar sensor 10 includes an antenna array with four antenna elements 36 situated on a horizontal straight line. Radar beams 38 that are transmitted from antenna elements 36 are reflected on object 20 and then received once again by the same antenna element that has transmitted them, and in each case thus differ in their run lengths by an amount 2*delta1. These run length differences result in differences in the complex amplitudes, in particular in the phases of the signals that are received from the various antenna elements 36 and then mapped onto d-v space 26 by Fourier transform. The distribution of the complex amplitudes for the four antenna elements 36 is characteristically a function of azimuth angle $\alpha 20$ at which object 20 is viewed by radar sensor 10. This angular dependency of the amplitude distribution may be represented in an antenna diagram, and in principle azimuth angle $\alpha 20$ may then be estimated by comparing the measured amplitude distribution to the antenna diagram.

The same also analogously applies for radar beams 40 that are reflected at object 22, which is viewed by radar sensor 10 at azimuth angle $\alpha 22$. In this case, the run length difference is 2*delta2.

However, since the signals received from objects 20 and 22 are situated in same distance cell D1 in all four reception channels of radar sensor 10, the signals cannot be separated from one another based on their frequencies, and the amplitude distribution that is ultimately measured is the result of a superimposition of radar beams 38 and 40. As a result, the correlation of the amplitude distribution with the antenna diagram is worsened (the angular quality becomes poorer), and the azimuth angle for which the amplitude distribution still best correlates with the measured distribution is a presumed angle that matches neither α20 nor α22.

Thus, instead of the two objects 20 and 22, radar sensor 10 locates a fictitious object situated at some other point on circle 24. Although the reliability of the angle estimation may be approximately estimated when the obtained angular quality is computed, it is still not possible to determine actual azimuth angles α20 and α22.

However, evaluating the signal of radar sensor 12 provides a simpler and more reliable option for detecting and correcting errors of the above-described type.

When radar sensor 10 establishes a distance cell that is not empty, for example distance cell D1, distance d1 of the object or objects in this cell may be determined, and based on the spatial configuration of radar sensors 10, 12 it is then possible to compute in which distance range other radar sensor 12 would have to view this object or these objects. The boundaries of locating ranges 16, 18 of the two radar sensors (FIG. 1) are known, and measured distance d1 provides the position of circle 24 on which the object(s) must be situated. The intersection points of this circle 24 with the boundaries of locating ranges 16 and 18 then provide an upper limit 42 and a lower limit 44 for distance range 46 in which objects 20 and 22 must be situated from the viewpoint of radar sensor 12.

If exactly two peaks 32, 34 now occur in d-v space 30 of radar sensor 12 in this distance range, thus, these two peaks must represent objects that are situated in d-v space 26 of radar sensor 10 in distance cell D1. It is thus clear that peak 28 in distance cell D1 is a superimposition that represents exactly two objects.

Since peaks 32 and 34 in d-v space 30 of radar sensor 12 are situated in separate distance cells D2, D3, their amplitude distributions may be evaluated separately, so that high-quality angle estimations may be made in order to determine the azimuth angles of objects 20 and 22 from the viewpoint of radar sensor 12.

To obtain a preferably accurate and correct image of the surroundings of the locating system, in this case the angle estimation carried out using radar sensor 10 is dispensed with, and the angle estimation using radar sensor 12 is instead relied on.

Based on the azimuth angles for objects 20 and 22, measured with radar sensor 12, azimuth angles α20 and α22 from the viewpoint of radar sensor 10 may then also be computed by simple geometric transformation. Alternatively, the information from radar sensor 12 may also be utilized to carry out an enhanced dual target angle estimation using radar sensor 10.

The absolute values of the amplitudes at the vertices of peaks 32 and 34 also provide indications for the ratio of the signal strengths of radar beams 38 and 40. This may then be used to compute the amplitude distribution that would be expected in radar sensor 10. For a consistency check, this expected amplitude distribution may now be compared to the amplitude distribution that radar sensor 10 has actually measured. If a deviation results, this may be corrected by varying the assumed ratio of the signal strengths. It may thus be established whether the reflectivity of objects 20 and 22 is different for the signals of radar sensor 10 than for the signals of radar sensor 12. Such differences in the reflectivity are to be expected when the objects are not punctiform or spherical, but instead have an angle-dependent radar cross section.

Of course, the reverse approach may also be taken, initially searching for nonempty distance cells in d-v space 30 of radar sensor 12, and subsequently searching for the corresponding distance range in the d-v space of radar sensor 10. Depending on the object configuration, it is also possible that two objects may be separated only with radar sensor 10, but not with radar sensor 12.

Configurations are also possible in which radar sensor 10 establishes a nonempty distance cell D1, but radar sensor 12 locates only a single object in associated distance range 46. In this case, angle estimations with high angular quality may be made in both radar sensors 10, 12, and the results would have to be consistent. Consistency checks of this type may be used, for example, to detect a possible misalignment of one of the two radar sensors 10, 12 and correct it if necessary.

Since the reflectivity of the located single object may be dependent on the angle, and the two radar sensors may view the object from slightly different directions, the signal strengths measured in the two radar sensors may differ despite approximately equal object distances. Since the distances from the object, measured with the two sensors, are known, the dependency of the signal strength on distance may be corrected by computer, so that the radar cross sections of the object for the viewing directions of the two radar sensors may be compared to one another.

Figure 4:
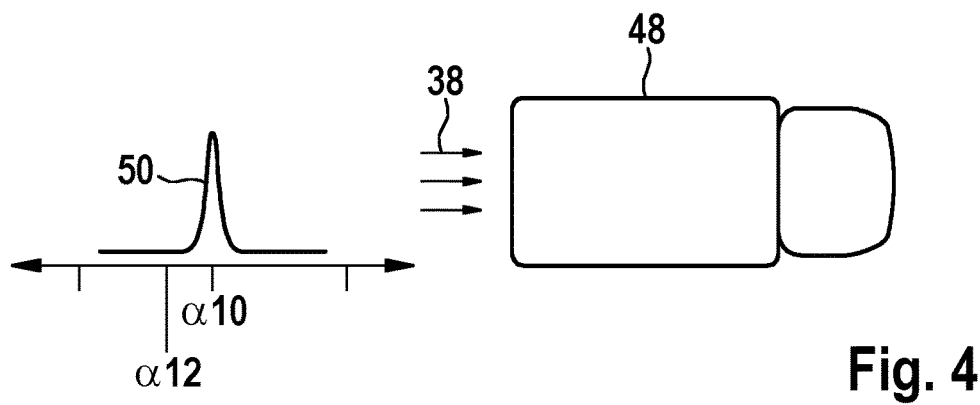
FIG. 4 shows a diagram for illustrating a radar cross section of the rear end of a truck.

As an example, FIG. 4 illustrates a case in which radar sensor 10 views a rear end of a truck 48 at an azimuth angle α10 of approximately 0°. The largely flat rear end of the truck, oriented at a right angle to radar beams 38, results in a large radar cross section and a correspondingly high reflectivity in the 0° direction. In contrast, radar sensor 12 views truck 48 at an azimuth angle α12 that is different from 0°. The radar beams of this sensor (not shown in FIG. 4) therefore strike the rear end of the truck obliquely, and are reflected in such a way that, apart from diffraction effects, they do not strike radar sensor 12 again. The angular dependency of the reflectivity of the rear end of truck 48 is indicated by a curve 50 in FIG. 4. Radar sensor 10 measures a high reflectivity, while radar sensor 12 measures a much lower reflectivity.

Figure 5:
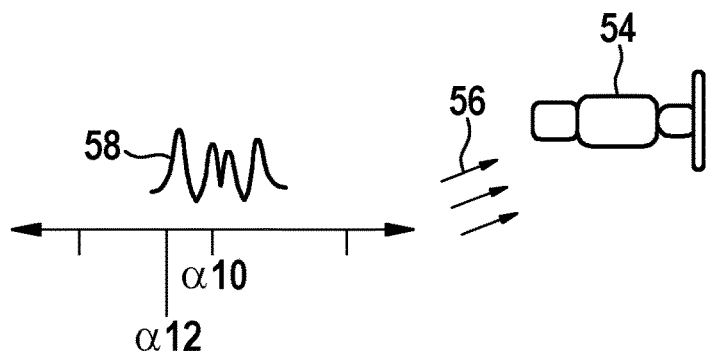
FIG. 5 shows a diagram for illustrating a radar cross section of a two-wheeler that is oriented at an angle to the propagation direction of the radar waves.

For comparison, FIG. 5 illustrates a situation in which radar sensor 10 locates a two-wheeler 54 at azimuth angle α10 of approximately 0°. Radar sensor 12 locates this two-wheeler at azimuth angle α12, which is different from 0, and therefore views two-wheeler 54 obliquely, symbolized here by an angled position of the two-wheeler with respect to radar beams 56 of radar sensor 12. The angular dependency of the radar cross section is indicated here by a curve 58. When viewed from the side, the radar cross section of two-wheeler 54 is larger than when viewed directly from the rear, so that in this case radar sensor 12 measures a stronger signal than does radar sensor 10.

Based on such differences in the signal strengths or reflectivities measured by the radar sensors, it is thus possible to deduce the type of located objects.

Locating ranges 16, 18 of radar sensors 10 and 12, illustrated in FIG. 1 as circle segments, in practice do not have distinct boundaries at the left and right edges. Rather, the illumination with the transmitted radar beams as well as the sensitivity to the received radar echoes gradually decrease with increasing azimuth angle. For objects situated close to the boundary of the locating range of a radar sensor, the radar echo may thus become so weak that it is no longer detectable with this sensor, or at least is no longer reliably distinguishable from the background noise. For this reason, configurations may also occur in which, for example, radar sensor 10 locates at least one object in distance cell D1, but radar sensor 12 establishes no objects in associated distance range 46. However, during error-free operation of the locating system, such situations may occur only when the azimuth angle that is measured with radar sensor 10 indicates a position of the object close to the boundary of locating range 18 of radar sensor 12. In addition, in such situations the method according to the present invention thus allows a type of self-testing of the locating system.

It is understood that the example method is not limited to locating systems that include only two radar sensors. The locating system preferably includes at least three radar sensors, one of which is preferably also offset in the vertical relative to the two other sensors, so that the direction angles at which the objects are located by the various radar sensors vary not only in the azimuth, but also in elevation. This allows a high separation capability, even in situations in which two radar targets or two reflection centers are situated at the same distance and at the same azimuth angle, but at different heights. Likewise, by the detection of differences in the radar cross section for different elevation angles, an even more highly differentiated object classification is made possible, in particular a clearer distinction between a passenger vehicle and a truck.

Figure 6:
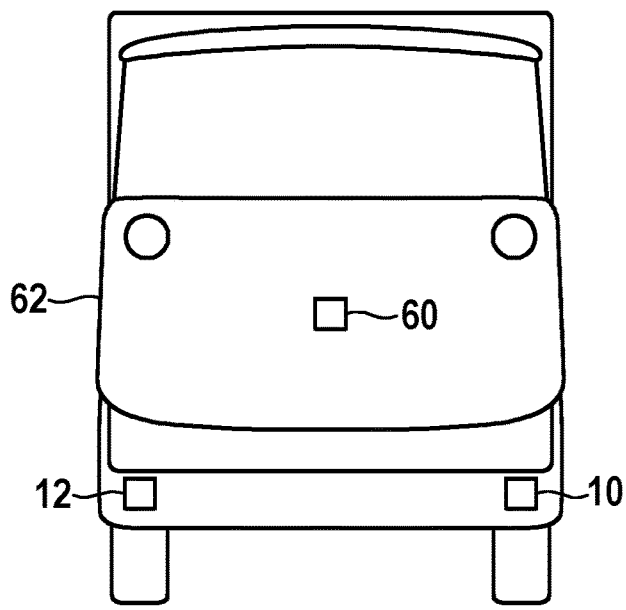
FIG. 6 shows a front view of a truck that includes a locating system that is designed for an example method according to the present invention.

As an example, FIG. 6 shows a locating system that includes three radar sensors 10, 12, 60 that are installed in the front end of a truck 62. In this case the radar sensors, in the view from the front, form an isosceles right triangle with a horizontal base.

What is claimed is:

1. A method for signal evaluation in a locating system that includes multiple radar sensors whose locating ranges overlap one another, the method comprising:
   evaluating a signal of a first one of the radar sensors and identifying distance cells that are not empty; and
   for at least one of the non-empty distance cells:
      selecting a second one of the radar sensors and determining a distance range in which objects situated in the distance cell would have to be situated from a viewpoint of the second one of the radar sensors; and
      classifying an object configuration in the distance range, based on a signal of the second one of the radar sensors;
      wherein absolute values of amplitudes at vertices of peaks in a distance-velocity (d-v) space of one of the radar sensors provide indications for a ratio of signal strengths of radar beams, which are then used to compute an amplitude distribution expected in the one of the radar sensors, wherein for a consistency check, the expected amplitude distribution is compared to an amplitude distribution that the radar sensor has actually measured, and wherein when a deviation results, the deviation is corrected by varying an assumed ratio of the signal strengths, so as to establish whether the reflectivity of the objects is different for signals of the one of the radar sensors than for signals of another of the radar sensors, wherein it is determined that the objects have an angle-dependent radar cross section because the reflectivity of the objects is different, so that the objects are determined not to be punctiform or spherical, and
      wherein the multiple radar sensors include at least three radar sensors, one of which is also offset in a vertical direction relative to two of the other radar sensors, so that direction angles at which the objects are located by the radar sensors vary in an azimuth and in an elevation, wherein by detecting differences in a radar cross section for different elevation angles, a more differentiated object classification is provided to distinguish between different objects;
      wherein when one of the radar sensors establishes that one of the distance cells is not empty, a distance of an object or the objects in the cell is determined, and based on a spatial configuration of the radar sensors, a distance range of another of the radar sensors to view the object or the objects is determined, and wherein boundaries of the locating ranges of two of the radar sensors is known, and the determined distance provides a position of a circle on which the object or the objects is situated, and wherein intersection points of the circle with the boundaries of the locating ranges provide an upper limit and a lower limit for the distance range in which the object or the objects is situated from a viewpoint of the radar sensor,
      wherein if peaks occur in a d-v space of the radar sensor in the distance range, wherein the peaks represent the object or the objects in the d-v space of the radar sensor in the distance cell, so that a peak in the distance cell is a superimposition representing the objects, and wherein peaks in the d-v space of the radar sensor are situated in separate ones of the distance cells, so that amplitude distributions of the peaks are evaluated separately, so that angle estimations are made to determine azimuth angles of the objects from a viewpoint of the radar sensor,
      wherein the second radar sensor is spatially offset relative to the first radar sensor, so that the first and second radar sensors measure different distances for different ones of the objects, and wherein in the d-v space of the second radar sensor, the objects are represented by signal peaks, which are situated in different ones of the distance cells, and
      wherein by evaluating the signals of the second radar sensor, it is established that a third peak is a superimposition of radar echoes from different objects.

2. The method as recited in claim 1, wherein the classification of the object configuration includes a determination of a number of objects in the nonempty distance cell of the first one of the radar sensors.

3. The method as recited in claim 2, wherein when multiple objects are situated in the same distance cell for one of the radar sensors, an angle estimation for determining direction angles for the multiple objects is carried out using a radar sensor for which the multiple objects are situated in separate distance cells.

4. The method as recited in claim 2, wherein when multiple objects are situated in the same distance cell for one of the radar sensors, information of the one of the radar sensors is utilized to carry out an enhanced dual target angle estimation using another of the radar sensors.

5. The method as recited in claim 1, wherein the classification of the object configuration includes a comparison of radar cross sections of an object that is located by multiple of the radar sensors, based on signal strengths received from the multiple of the radar sensors.

6. The method as recited in claim 5, wherein a hypothesis concerning a type of located object is made based on the comparison of the radar cross sections.

7. A locating system for a motor vehicle, comprising:
   multiple radar sensors, wherein locating ranges of the multiple radar sensors overlap one another; and
   an evaluation unit configured to perform the following:
      evaluating a signal of a first one of the radar sensors and identifying distance cells that are not empty; and for at least one of the non-empty distance cells:
selecting a second one of the radar sensors and determining a distance range in which objects situated in the distance cell would have to be situated from a viewpoint of the second one of the radar sensors; and
classifying an object configuration in the distance range, based on a signal of the second one of the radar sensors;
wherein absolute values of amplitudes at vertices of peaks in a distance-velocity (d-v) space of one of the radar sensors provide indications for a ratio of signal strengths of radar beams, which are then used to compute an amplitude distribution expected in the one of the radar sensors, wherein for a consistency check, the expected amplitude distribution is compared to an amplitude distribution that the radar sensor has actually measured, and wherein when a deviation results, the deviation is corrected by varying an assumed ratio of the signal strengths, so as to establish whether the reflectivity of the objects is different for signals of the one of the radar sensors than for signals of another of the radar sensors, wherein it is determined that the objects have an angle-dependent radar cross section because the reflectivity of the objects is different, so that the objects are determined not to be punctiform or spherical, and
wherein the multiple radar sensors include at least three radar sensors, one of which is also offset in a vertical direction relative to two of the other radar sensors, so that direction angles at which the objects are located by the radar sensors vary in an azimuth and in an elevation, wherein by detecting differences in a radar cross section for different elevation angles, a more differentiated object classification is provided to distinguish between different objects;
wherein when one of the radar sensors establishes that one of the distance cells is not empty, a distance of an object or the objects in the cell is determined, and based on a spatial configuration of the radar sensors, a distance range of another of the radar sensors to view the object or the objects is determined, and wherein boundaries of the locating ranges of two of the radar sensors is known, and the determined distance provides a position of a circle on which the object or the objects is situated, and wherein intersection points of the circle with the boundaries of the locating ranges provide an upper limit and a lower limit for the distance range in which the object or the objects is situated from a viewpoint of the radar sensor,
wherein if peaks occur in a d-v space of the radar sensor in the distance range, wherein the peaks represent the object or the objects in the d-v space of the radar sensor in the distance cell, so that a peak in the distance cell is a superimposition representing the objects, and wherein peaks in the d-v space of the radar sensor are situated in separate ones of the distance cells, so that amplitude distributions of the peaks are evaluated separately, so that angle estimations are made to determine azimuth angles of the objects from a viewpoint of the radar sensor,
wherein the second radar sensor is spatially offset relative to the first radar sensor, so that the first and second radar sensors measure different distances for different ones of the objects, and wherein in the d-v space of the second radar sensor, the objects are represented by signal peaks, which are situated in different ones of the distance cells, and
wherein by evaluating the signals of the second radar sensor, it is established that a third peak is a superimposition of radar echoes from different objects.

8. A non-transitory machine-readable storage medium, on which is stored a computer program, which is executable by a processor, comprising:
a program code arrangement having program code for providing signal evaluation in a locating system that includes multiple radar sensors whose locating ranges overlap one another, by performing the following:
evaluating a signal of a first one of the radar sensors and identifying distance cells that are not empty; and
for at least one of the non-empty distance cells:
selecting a second one of the radar sensors and determining a distance range in which objects situated in the distance cell would have to be situated from a viewpoint of the second one of the radar sensors; and
classifying an object configuration in the distance range, based on a signal of the second one of the radar sensors;
wherein absolute values of amplitudes at vertices of peaks in a distance-velocity (d-v) space of one of the radar sensors provide indications for a ratio of signal strengths of radar beams, which are then used to compute an amplitude distribution expected in the one of the radar sensors, wherein for a consistency check, the expected amplitude distribution is compared to an amplitude distribution that the radar sensor has actually measured, and wherein when a deviation results, the deviation is corrected by varying an assumed ratio of the signal strengths, so as to establish whether the reflectivity of the objects is different for signals of the one of the radar sensors than for signals of another of the radar sensors, wherein it is determined that the objects have an angle-dependent radar cross section because the reflectivity of the objects is different, so that the objects are determined not to be punctiform or spherical, and
wherein the multiple radar sensors include at least three radar sensors, one of which is also offset in a vertical direction relative to two of the other radar sensors, so that direction angles at which the objects are located by the radar sensors vary in an azimuth and in an elevation, wherein by detecting differences in a radar cross section for different elevation angles, a more differentiated object classification is provided to distinguish between different objects;
wherein when one of the radar sensors establishes that one of the distance cells is not empty, a distance of an object or the objects in the cell is determined, and based on a spatial configuration of the radar sensors, a distance range of another of the radar sensors to view the object or the objects is determined, and wherein boundaries of the locating ranges of two of the radar sensors is known, and the determined distance provides a position of a circle on which the object or the objects is situated, and wherein intersection points of the circle with the boundaries of the locating ranges provide an upper limit and a lower limit for the distance range in which the object or the objects is situated from a viewpoint of the radar sensor, wherein if peaks occur in a d-v space of the radar sensor in the distance range, wherein the peaks represent the object or the objects in the d-v space of the radar sensor in the distance cell, so that a peak in the distance cell is a superimposition representing the objects, and wherein peaks in the d-v space of the radar sensor are situated in separate ones of the distance cells, so that amplitude distributions of the peaks are evaluated separately, so that angle estimations are made to determine azimuth angles of the objects from a viewpoint of the radar sensor, wherein the second radar sensor is spatially offset relative to the first radar sensor, so that the first and second radar sensors measure different distances for different ones of the objects, and wherein in the d-v space of the second radar sensor, the objects are represented by signal peaks, which are situated in different ones of the distance cells, and wherein by evaluating the signals of the second radar sensor, it is established that a third peak is a superimposition of radar echoes from different objects.

\* \* \* \* \*